US012481236B2

(12) United States Patent
Doda et al.

(10) Patent No.: US 12,481,236 B2
(45) Date of Patent: Nov. 25, 2025

(54) HEATING APPARATUS AND IMAGE FORMING APPARATUS

(71) Applicant: CANON KABUSHIKI KAISHA, Tokyo (JP)

(72) Inventors: Kazuhiro Doda, Kanagawa (JP); Tsuguhiro Yoshida, Kanagawa (JP); Kohei Wakatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 18/506,368

(22) Filed: Nov. 10, 2023

(65) Prior Publication Data

US 2024/0160131 A1 May 16, 2024

(30) Foreign Application Priority Data

Nov. 14, 2022 (JP) ................................ 2022-181542

(51) Int. Cl.
*G03G 15/20* (2006.01)
*G03G 15/00* (2006.01)

(52) U.S. Cl.
CPC ..... *G03G 15/2039* (2013.01); *G03G 15/5004* (2013.01)

(58) Field of Classification Search
CPC ....................... G03G 15/2039; G03G 15/5004
See application file for complete search history.

(56) References Cited

U.S. PATENT DOCUMENTS

2013/0343791 A1* 12/2013 Shimura ............ G03G 15/2042 399/329
2014/0341599 A1* 11/2014 Itoh .................... G03G 15/2039 399/69
2018/0032008 A1* 2/2018 Sako .................. G03G 15/2042
2020/0233352 A1* 7/2020 Doda ................. G03G 15/2053
2021/0072681 A1 3/2021 Wakatsu

* cited by examiner

*Primary Examiner* — Stephanie E Bloss
*Assistant Examiner* — Michael A Harrison
(74) *Attorney, Agent, or Firm* — Canon U.S.A., Inc. IP Division

(57) ABSTRACT

A heating apparatus includes a fixing film and a heater in the inner space of the fixing film. The heater includes a long narrow substrate and at least two or more heating elements with different lengths in a longitudinal direction. The heating apparatus further includes first and second temperature detection units configured to detect a temperature of the heater and a control unit configured to set the power ratio between a first heating element and a second heating element in response to the detection result of the second temperature detection unit.

12 Claims, 11 Drawing Sheets

HEATING APPARATUS AND IMAGE FORMING APPARATUS

BACKGROUND

Field

The present disclosure relates to image forming apparatuses including a heating apparatus.

Description of the Related Art

Electrophotographic image forming apparatuses generally include a heating apparatus that heats toner transferred to sheets in order to fix the toner to the sheets. U.S. Patent Application Publication No. 2021/0072681 discloses a heating apparatus including a plurality of heating elements of different lengths in a longitudinal direction perpendicular to a sheet conveying direction. This heating apparatus adjusts the ratio of power to be supplied to the individual heating elements.

However, for example, depending on the longitudinal length of the sheets, adjusting the power ratio to a power ratio different from a predetermined power ratio is also required.

SUMMARY

The present disclosure provides a unit configured to control the power ratio in accordance with the situation.

A heating apparatus according to an aspect of the present disclosure includes a first rotatable member, a heater disposed in an inner space of the first rotatable member, first and second temperature detection units configured to detect a temperature of the heater, and a control unit configured to control power to be supplied to the heater. The heater includes a long narrow substrate, a first heating element, and a second heating element, the first and second heating elements being disposed on the substrate. A direction of a long side of a surface of the substrate on which the heating element is disposed is a longitudinal direction, a direction perpendicular the longitudinal direction of the surface is a crosswise direction, and a direction perpendicular to the longitudinal direction and the crosswise direction is a thickness direction, a length of the first heating element in the longitudinal direction is longer than a length of the second heating element in the longitudinal direction, the second temperature detection unit is disposed closer to an end of the heater in the longitudinal direction than the first temperature detection unit. In response to the second temperature detection unit detecting a first temperature, the control unit sets a power ratio between the first heating element and the second heating element to a first value, and in response to the second temperature detection unit detecting a second temperature higher than the first temperature, the control unit sets the power ratio to a second value greater than the first value.

According to an aspect of the present disclosure, the power ratio can be controlled according to the situation.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. In these embodiments, conveying a sheet to a fixing nip portion is also referred to as "passing a sheet". Of the region in which heating elements generate heat, an area corresponding to a region through which the sheet is not passing is also referred to as "non-sheet passing region (or non-sheet passing portion). A region through which the sheet is passing is also referred to as "sheet passing region (sheet passing portion).

A phenomenon in which the temperature of the non-sheet passing region is higher than that of the sheet passing region is also referred to as "an increase in non-sheet passing portion temperature". In contrast, a phenomenon in which the temperature of the non-sheet passing region is lower than that of the sheet passing region is also referred to as "a decrease in end temperature".

First Embodiment

Image Forming Apparatus

Figure 1:
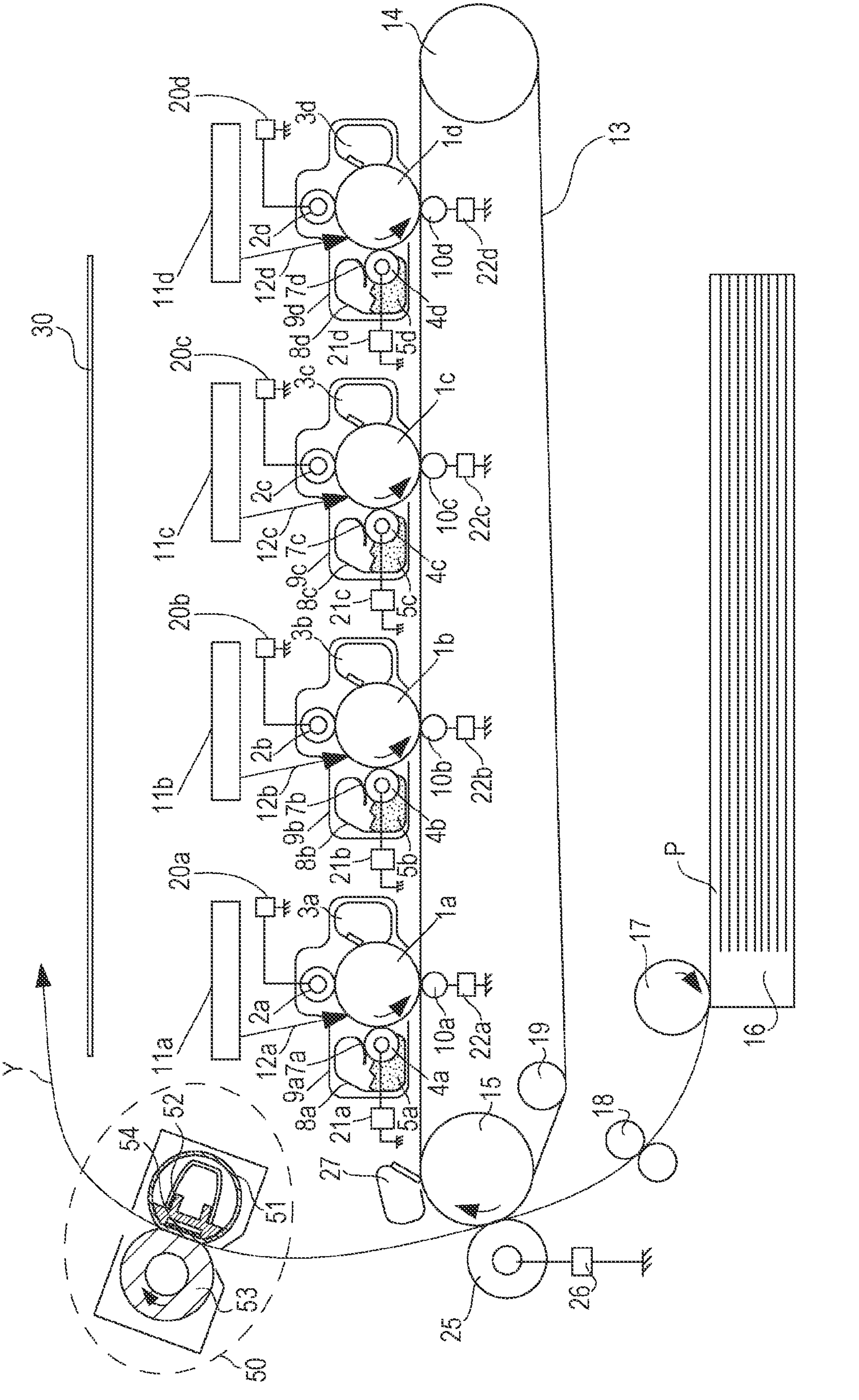
FIG. 1 is a schematic configuration diagram illustrating an image forming apparatus.

FIG. 1 is a configuration diagram illustrating an in-line color image forming apparatus, which is an example of image forming apparatuses. Referring to FIG. 1, the operation of the electrophotographic color image forming apparatus will be described. A first station is a station for forming a yellow (Y) toner image. A second station is a station for forming a magenta (M) toner image. A third station is a station for forming a cyan (C) toner image. A fourth station is a station for forming a black (K) toner image.

A photosensitive drum 1*a*, which is an image bearing member, in the first station is an organic photoconductor (OPC) drum. The photosensitive drum 1*a* is a laminate of a plurality of functional organic materials, on a metallic cylinder, including a carrier forming layer that is exposed to light to generate an electric charge and a charge transport layer that transports the generated electric charge, of which the outermost layer has low electrical conductivity and is nearly insulating. A charging roller 2*a*, which is a charging unit, is in contact with the photosensitive drum 1*a* and uniformly charges the surface of the photosensitive drum 1*a* while being rotated with the rotation of the photosensitive drum 1*a*. The charging roller 2*a* receives a superimposed direct-current voltage or alternating-current voltage to cause electric discharge in minute air gaps upstream and downstream in the rotating direction from a nip portion between the charging roller 2*a* and the surface of the photosensitive drum 1*a*, thereby charging the photosensitive drum 1*a*. A cleaning unit 3*a* is a unit for cleaning toner remaining on the photosensitive drum 1*a* after the transfer, described later. A developing unit 8*a* for development includes a developing roller 4*a*, a non-magnetic monocomponent toner 5*a*, and a developer application blade 7. The photosensitive drum 1*a*, the charging roller 2*a*, the cleaning unit 3*a*, and the developing unit 8*a* constitute an integrated process cartridge 9*a* that is detachably mounted to the image forming apparatus.

An exposing unit 11*a* for exposure is constituted by a scanner unit that scans laser light using a polygonal mirror or a light-emitting diode (LED) array and emits a scanning beam 12*a* modulated in response to an image signal onto the photosensitive drum 1*a*. The charging roller 2*a* is connected to a charging high-voltage power source 20*a* for supplying a voltage to the charging roller 2*a*. The developing roller 4*a* is connected to a developing high-voltage power source 21*a* for supplying a voltage to the developing roller 4*a*. A primary transfer roller 10*a* is connected to a primary transfer high-voltage power source 22*a* for supplying a voltage to the primary transfer roller 10*a*.

This is the configuration of the first station. Second, third, and fourth stations have the same configuration. For the other stations, components having the same function as in the first station are given the same reference signs, and suffixes b, c, and d are added to the signs of the individual stations. In the following description, the suffixes a, b, c, and d may be omitted except when a specific station is described.

An intermediate transfer belt 13 is supported by three rollers: a secondary transfer facing roller 15, a tension roller 14, and an auxiliary roller 19 serving as stretching members. Only the tension roller 14 is given a force in the direction of stretching the intermediate transfer belt 13 by a spring to keep appropriate tension to the intermediate transfer belt 13.

The secondary transfer facing roller 15 is rotated by the rotary drive from a main motor (not shown) to rotate the intermediate transfer belt 13 wound therearound. The intermediate transfer belt 13 moves forward (for example, clockwise in FIG. 1) at substantially the same speed as the photosensitive drums 1*a* to 1*d* (for example, rotating counterclockwise in FIG. 1). The intermediate transfer belt 13 rotates in the direction of the arrow (clockwise). The primary transfer roller 10 is disposed on the opposite side of the intermediate transfer belt 13 from the photosensitive drum 1 and is rotated with the movement of the intermediate transfer belt 13. A position where the photosensitive drum 1 and the primary transfer roller 10 are in contact, with the intermediate transfer belt 13 therebetween, is referred to as a primary transfer position. The auxiliary roller 19, the tension roller 14, and the secondary transfer facing roller 15 are electrically grounded. For the second to fourth stations, the primary transfer rollers 10*b* to 10*d* also have the same configuration as the primary transfer roller 10*a* of the first station, and descriptions thereof will be omitted.

Next, the image forming operation of the image forming apparatus of the first embodiment will be described. Upon receiving a print instruction during standby, the image forming apparatus starts the image forming operation. The photosensitive drum 1 and the intermediate transfer belt 13 start to be rotated in the direction of arrow so as to reach a predetermined process speed by the driving force from a main motor (not shown). The photosensitive drum 1*a* is uniformly charged by the charging roller 2*a* subjected to a voltage by the charging high-voltage power source 20*a*, and then an electrostatic latent image according to image information is formed by a scanning beam 12*a* emitted from the exposing unit 11*a*.

Toner 5*a* in the developing unit 8*a* is charged to negative polarity by the developer application blade 7*a* and is applied to the developing roller 4*a*. The developing roller 4*a* is supplied with a predetermined developing voltage by the developing high-voltage power source 21*a*. When the photosensitive drum 1*a* rotates, so that the electrostatic latent image formed on the photosensitive drum 1*a* reaches the developing roller 4*a*, the negative-polarity toner adheres to the electrostatic latent image to visualize it, so that a first color (for example, yellow (Y)) toner image is formed on the photosensitive drum 1*a*. The stations (process cartridges 9*b* to 9*d*) of the other colors: magenta (M), cyan (C), and black (K) also operate in the same way.

Electrostatic latent images due to exposure are formed on the photosensitive drums 1*a* to 1*d* in response to delayed write signals from a controller (not shown) at a constant timing in accordance with the distance between the primary transfer positions of the individual colors. The primary transfer rollers 10*a* to 10*d* receive direct-current high voltages of a polarity opposite to the toner. With the above processes, the toner images are transferred to the intermediate transfer belt 13 in sequence (hereinafter also referred to as primary transfer) to form a multiple toner image on the intermediate transfer belt 13.

Thereafter, sheets P, for example, paper, placed in a paper cassette 16 are conveyed along the conveying path in accordance with the formation of the toner image. Specifically, each sheet P is fed (picked up) by a sheet feeding roller 17, which is rotationally driven by a sheet feeding solenoid (not shown). The fed sheet P is conveyed to registration rollers 18 by a conveying roller. The sheet P is conveyed to a transfer nip portion, which is a contact portion between the intermediate transfer belt 13 and the secondary transfer roller 25, by the registration rollers 18 in synchronization with the toner image on the intermediate transfer belt 13. The secondary transfer roller 25 receives a voltage of a polarity opposite to the polarity of the toner from a secondary transfer high-voltage power source 26, so that the four-color multiple toner image carried on the intermediate transfer belt 13 is transferred onto the sheet P in a single step (hereinafter also referred to as secondary transfer).

The members responsible for forming the unfixed toner image on the sheet P (for example, the photosensitive drum 1) function as an image forming unit. In contrast, the toner remaining on the intermediate transfer belt 13 after the completion of the secondary transfer is cleaned by a cleaning unit 27. The sheet P after the completion of the secondary transfer is conveyed to a fixing unit 50 for fixing. The toner image is heated and pressed by the fixing unit 50 and is discharged as image formed matter (a print or a copy) to a discharge tray 30. A film 51, a heater holder (a nip forming member) 52, a pressure roller 53, and a heater 54 of the fixing unit 50 will be described later.

Block Diagram of Image Forming Apparatus

Figure 2:
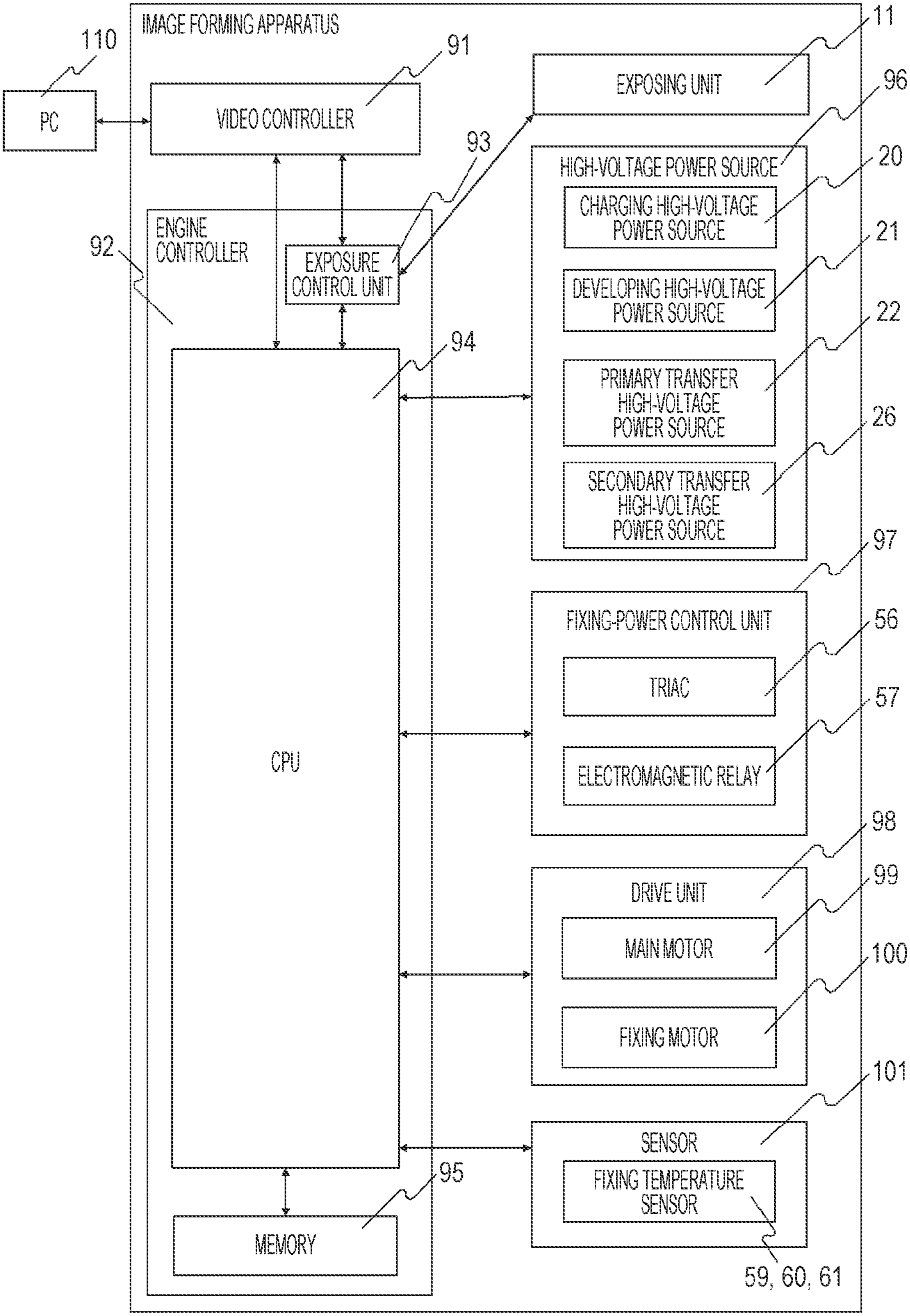
FIG. 2 is a control block diagram illustrating the image forming apparatus.

FIG. 2 is a block diagram illustrating the operation of the image forming apparatus. The printing operation of the image forming apparatus will be described with reference to this diagram. A personal computer (PC) 110, serving as a host computer, assumes a role of outputting a print instruction to a video controller 91 in the image forming apparatus and transferring image data on the print image to the video controller 91. At that time, the size of the image data (hereinafter also referred to as image size) is determined according the sheet size (hereinafter also referred to as a specified sheet size) specified by the PC 110 serving as a specification unit. A sheet size input from an input unit (not shown) of the image forming apparatus may be used as the specified sheet size. In this case, the input unit corresponds to the specification unit. In the first embodiment, the size obtained by subtracting a sheet edge margin of 5 mm, a total of opposite edge margins 10 mm, from the specified sheet size is the image size.

The video controller 91 converts the image data from the PC 110 to exposure data and transfers the exposure data to an exposure control unit 93 in an engine controller 92. The exposure control unit 93 is controlled by a central processing unit (CPU) 94 and controls the on/off of the exposure data and the exposing unit 11. The size of the exposure data is determined by the size of the image size. Upon receiving the print instruction, the CPU 94 starts an image forming sequence.

The engine controller 92, serving as a control unit, includes the CPU 94 and a memory 95 and performs a programmed operation. A high-voltage power source 96 includes the charging high-voltage power source 20, the developing high-voltage power source 21, the primary transfer high-voltage power source 22, and the secondary transfer high-voltage power source 26 described above. A fixing-power control unit 97 includes a bidirectional thyristor (hereinafter also referred to as a triac) 56 and an electromagnetic relay 57 serving as a switch for exclusively selecting a heating element that supplies power. The fixing-power control unit 97 selects a heating element that generates heat in the fixing unit 50 to determine the amount of power to be supplied.

The drive unit 98 includes a main motor 99 and a fixing motor 100. A sensor 101 includes fixing temperature sensors 59, 60, and 61 for detecting the temperature of the fixing unit 50. The detection result of the sensor 101 is transmitted to the CPU 94. The CPU 94 obtains the detection result of the sensor 101 in the image forming apparatus and controls the exposing unit 11, the high-voltage power source 96, the fixing-power control unit 97, and the drive unit 98. Thus, the CPU 94 controls the image forming process of forming an electrostatic latent image, transferring the developed toner image, and fixing the toner image to the sheet P so that the exposure data is printed as a toner image on the sheet P. The image forming apparatus to which the present disclosure is applied is not limited to the image forming apparatus with the configuration illustrated in FIG. 1 and may be any image forming apparatus capable of printing on sheets P of different widths and including the fixing unit 50 including a heater 54 described later.

Fixing Unit

Figure 3:
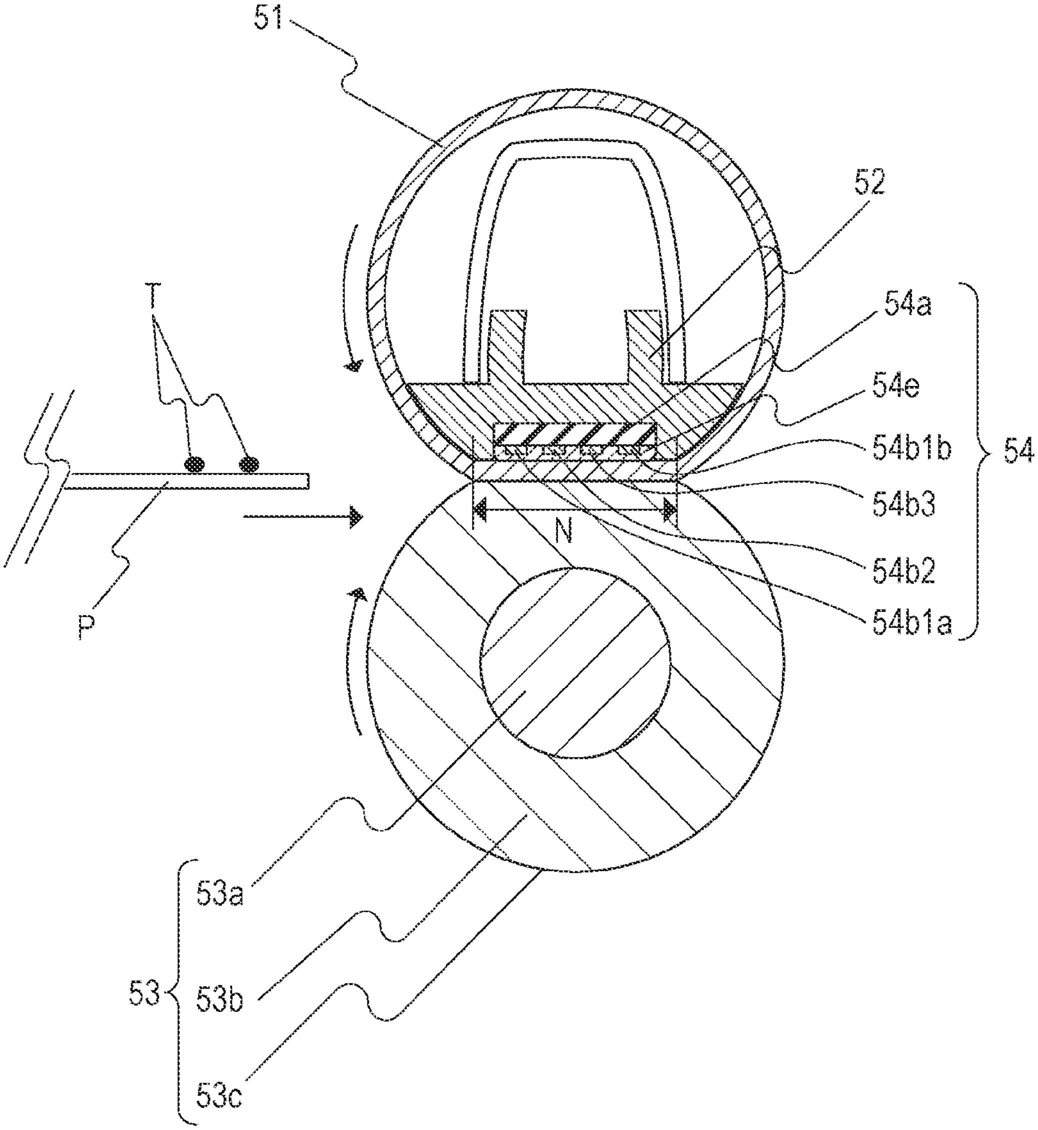
FIG. 3 is a cross-sectional view of a fixing unit illustrating the configuration thereof.
Figure 4:
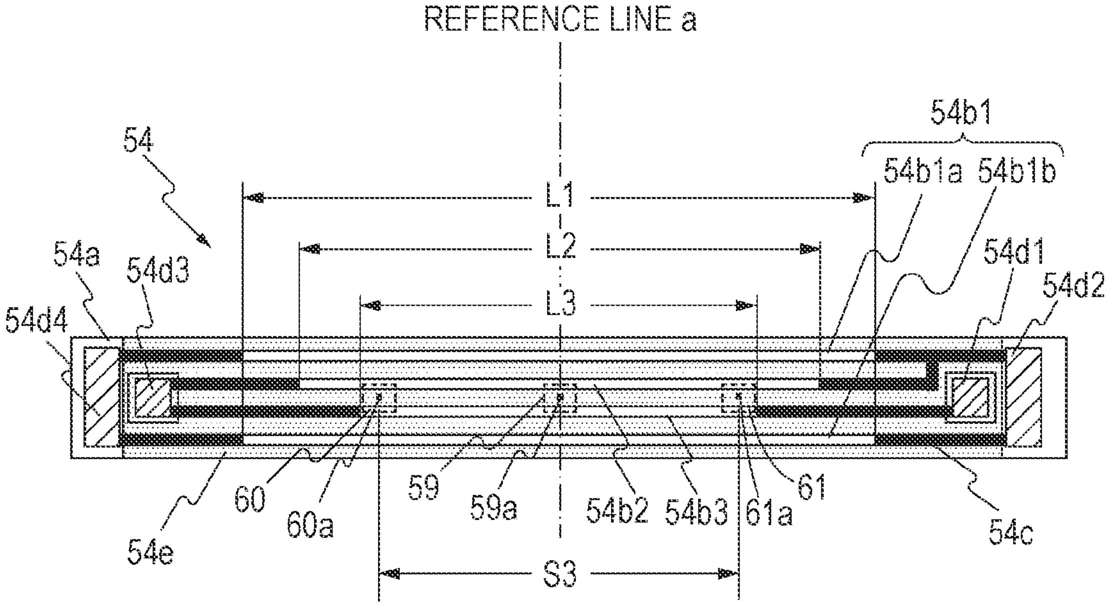
FIG. 4 is a schematic diagram illustrating the configuration of a heater.
Figure 5:
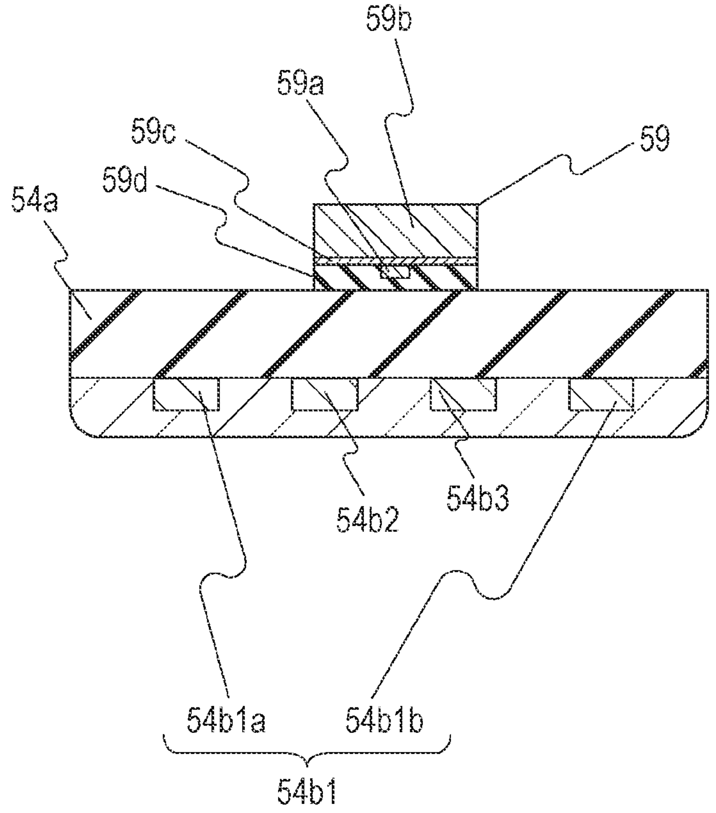
FIG. 5 is a cross-sectional view of the heater illustrating the configuration thereof.
Figure 6:
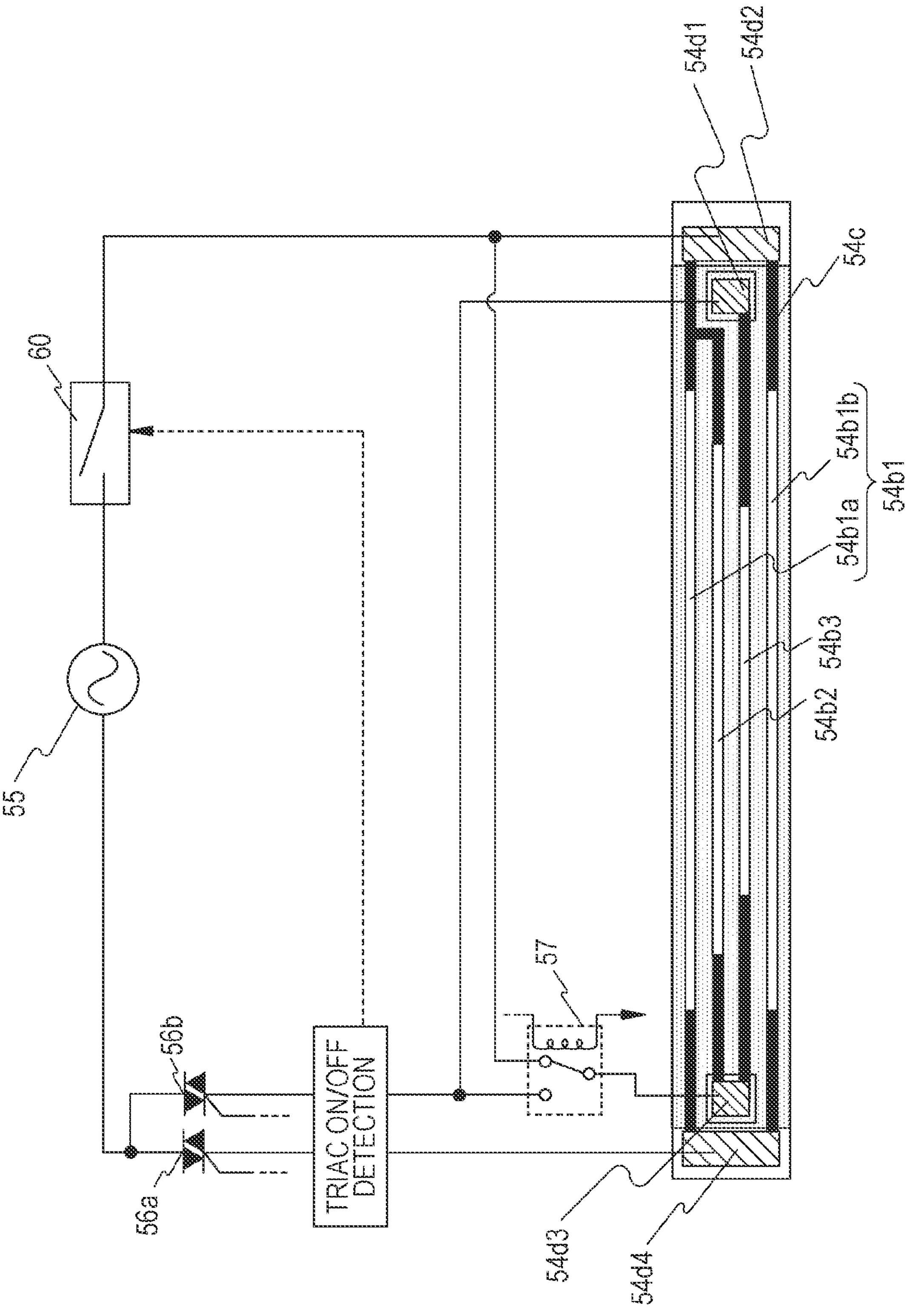
FIG. 6 is a schematic diagram of a power control circuit of the fixing unit.

Next, the configuration of the fixing unit 50 of the first embodiment will be described with reference to FIGS. 3 to 6. The direction of the long sides of the long thin heater 54 in FIG. 4 is also referred to as a longitudinal direction (the lateral direction in FIG. 4), and the direction of the short sides of the heater 54 perpendicular to the longitudinal direction is also referred to a crosswise direction (the vertical direction in FIG. 4). The direction of the thickness of the heater 54 perpendicular to the longitudinal direction and the crosswise direction is also referred to as a thickness direction (the front-back direction in FIG. 4). FIG. 3 is a schematic cross-sectional view of the fixing unit 50. FIG. 4 is a schematic diagram of the heater 54. FIG. 5 is a schematic cross-sectional view of the heater 54. FIG. 6 is a schematic circuit diagram of the fixing-power control unit 97 for the heater 54 of the fixing unit 50. In FIG. 4, the longitudinal center of the heating elements **54*b*1*a*, 54*b*1*b*, 54*b*2, and 54*b*3, which is the center line in the longitudinal direction of the sheet P conveyed to the fixing unit 50, is indicated by the dashed-dotted line in the diagram. The cross-sectional view of FIG. 5** is a cross-section taken along the dashed-dotted line. The dashed-dotted line is also referred to as a reference line a.

The sheet P carrying an unfixed toner image Tn is heated and pressed at the fixing nip portion N while being conveyed from the left to right in FIG. 3 so that the toner image Tn is fixed to the sheet P. The fixing unit 50 of the first embodiment includes the tubular film 51 serving as a first rotatable member, the heater holder 52 that holds the heater 54, and a pressure roller 53, serving as a second rotatable member, that forms a fixing nip portion N with the film 51. The fixing unit 50 further includes a stay that supports the heater 54 and the heater holder 52 disposed in the inner space of the film 51.

The film 51 is a fixing film serving as a heating rotatable member. In the first embodiment, its base layer contains, for example, polyimide. On the base layer, an elastic layer that contains silicone rubber and a releasing layer that contains perfluoroalkoxy alkane (PFA) are formed. The film 51 has grease on the inner surface to reduce the frictional force generated between the heater holder 52/the heater 54 and the film 51 due to the rotation of the film 51.

The heater holder 52 has the function of guiding the film 51 from the inside and forming the fixing nip portion N with the pressure roller 53, with the film 51 therebetween. The heater holder 52 is a rigid member with heat-resistant, heat-insulating properties and made of a liquid crystal polymer or the like. The film 51 is fitted on the heater holder 52. The pressure roller 53 serves as a pressurizing rotatable member. The pressure roller 53 includes a core metal **53*a*, an elastic layer 53*b*, and a releasing layer 53*c*. The pressure roller 53 is rotatably held at the opposite ends and is rotationally driven by the fixing motor 100 (see FIG. 2). The film 51 is rotated by the rotation of the pressure roller 53**.

The heater 54, serving as a heating member, is held by the heater holder 52 and is in contact with the inner surface of the film 51. The heater 54 is in contact with the film 51 as an example, but this is illustrative only. For example, a sliding plate may be provided between the heater 54 and the film 51. A substrate **54*a*, the heating elements 54*b*1*a*, 54*b*1*b*, 54*b*2, and 54*b*3, a protective glass layer 54*e*, and the fixing temperature sensors 59, 60, and 61** will be described later.

Heater

The heater 54 will be described in detail with reference to FIGS. 4 and 5. FIG. 4 is a schematic diagram illustrating the configuration of the heater 54 in which heating elements are disposed as viewed from the thickness direction of the heater 54. In FIG. 4, the reference line a is the center line in the longitudinal direction of the heating elements **54*b*1*a*, 54*b*1*b*, 54*b*2, and 54*b*3 and is the reference (center line) for conveying the sheet P to the fixing unit 50 in the longitudinal direction. As shown in FIG. 4, the heater 54 includes the long narrow substrate 54*a*, the heating elements 54*b*1*a*, 54*b*1*b*, 54*b*2, and 54*b*3, a conductor 54*c*, contact points 54*d*1, 54*d*2, 54*d*3, and 54*d*4, and the protective glass layer 54*e*. The conductor 54*c* is indicated by a solid black portion in FIG. 4. The heating elements 54*b*1*a*, 54*b*1*b*, 54*b*2, and 54*b*3 are disposed on the substrate 54*a***.

The substrate **54*a* of this embodiment contains alumina ($Al_2O_3$), or ceramic. Well-known examples of the ceramic substrate include alumina ($Al_2O_3$), aluminum nitride (AlN), zirconia ($ZrO_2$), and silicon carbide (SiC), among of which alumina ($Al_2O_3$) is inexpensive and easily available. The substrate 54*a*** may also be composed of high-strength metal.

A desirable example of the metal substrate is stainless steel (SUS), which excels in cost and strength. Both of the ceramic substrate and the metallic substrate, if having electrical conductivity, need only be provided with an insulating layer. The substrate 54*a* has thereon the heating elements 54*b*1*a*, 54*b*1*b*, 54*b*2, and 54*b*3, the conductor 54*c*, and the contact points 54*d*1 to 54*d*4, on which the protective glass layer 54*e* is formed to ensure insulation between the heating elements 54*b*1*a*, 54*b*1*b*, 54*b*2, and 54*b*3 and the film 51.

The heating elements 54*b*1*a*, 54*b*1*b*, 54*b*2, and 54*b*3 differ in the longitudinal length (the lateral length in FIG. 4). The longitudinal lengths L1 of the heating elements 54*b*1*a* and 54*b*1*b* are 222 mm, the longitudinal length L2 of the heating element 54*b*2 is 188 mm, and the longitudinal length L3 of the heating element 54*b*3 is 154 mm. The size order of the longitudinal lengths L1, L2, and L3 is L1>L2>L3. For example, if the sheet P is of A4 size, the heating element 54*b*1 is used for fixing. If the sheet P is of B5 size, the heating element 54*b*2 is mainly used for fixing. If the sheet P is of A5 size, the heating element 54*b*3 is mainly used for fixing.

As shown in FIG. 4, the heating elements 54*b*1*a* and 54*b*1*b* are electrically connected to the contact point 54*d*2 at one end and to the contact point 54*d*4 at the other end via the conductor 54*c*. The heating element 54*b*2 is electrically connected to the contact point 54*d*2 at one end and to the contact point 54*d*3 at the other end via the conductor 54*c*. Likewise, the heating element 54*b*3 is electrically connected to the contact point 54*d*1 at one end and to the contact point 54*d*3 at the other end via the conductor 54*c*. As shown in FIG. 4, the longitudinal lengths L1 of the heating element 54*b*1*a* and the heating element 54*b*1*b* are the same. When these two heating elements 54*b*1*a* and 54*b*1*b* are used, power is supplied simultaneously. The pair of heating elements 54*b*1*a* and 54*b*1*b* are hereinafter collectively referred to as a heating element 54*b*1. The heating elements 54*b*1, 54*b*2, and 54*b*3 are long and thin in the longitudinal direction, as shown in FIG. 4. The four heating elements 54*b*1*a*, 54*b*1*b*, 54*b*2, and 54*b*3 overlap, for example, at the reference line a, as seen in the crosswise direction.

As shown in FIG. 4, the heating elements 54*b*2 and 54*b*3 are arranged asymmetrically in the crosswise direction of the substrate 54*a*. For this reason, when the heating elements 54*b*2 and 54*b*3 are supplied with power, an asymmetric temperature gradient is given in the crosswise direction of the substrate 54*a*. For this reason, when maximum power is supplied to the heating element 54*b*2 or 54*b*3 for a certain period of time or more because of an unexpected failure or the like, thermal stress that deforms one end of the substrate 54*a* can be applied. In this embodiment, the maximum power provided to the heating elements 54*b*2 and 54*b*3 per unit length is small so that the thermal stress applied to the substrate 54*a* falls within a certain range. In contrast, the heating element 54*b*1 has such a resistance value that the maximum power per unit length is the largest to increase the temperature of the fixing unit 50 to a temperature at which the sheet P can pass in a short time. As shown in FIG. 4, the heating elements 54*b*1*a* and 54*b*1*b* are disposed symmetrically in the crosswise direction of the substrate 54*a*. This makes thermal stress unlikely to occur, allowing the maximum power to be set large. In this embodiment, the resistance values of the heating elements 54*b*1, 54*b*2, and 54*b*3 (the resistance values of all of the heating elements 54*b*1, 54*b*2, and 54*b*3) are set to 10Ω, 30Ω, and 30Ω, respectively.

The resistance value of the heating element 54*b*1 is a combined resistance value of the resistance of the two heating elements 54*b*1*a* and 54*b*1*b*. The maximum power for each heating element per unit length is expressed as Eq. (1).

$$\text{(power)/(length of heating element)=((input voltage)}^2\text{/(resistance value))/(length of heating element)} \quad (1)$$

For example, in this embodiment, if the input voltage is 110 V, the maximum power per unit length (1 m) for the heating element 54*b*1 is 5,450 W/m; 2,145 W/m for the heating element 54*b*2; and 2,619 W/m for the heating element 54*b*3 from Eq. (1). Thus, the maximum power per unit length differs among the heating elements 54*b*1, 54*b*2 and 54*b*3.

Fixing Temperature Sensor

The fixing temperature sensors 59, 60, and 61 shown in FIG. 4 are thermistors serving as temperature detection units. The fixing temperature sensors are hereinafter referred to as thermistors. They are the same thermistors.

FIG. 5 is a cross-sectional view of the heater 54 in the crosswise direction at the position of the thermistor 59. Since the cross-sectional views of the heater 54 in the crosswise direction at the positions of the thermistors 60 and 61 are the same, the following description is made with reference to the cross-sectional view at the position of the thermistor 59.

The thermistor 59 includes a thermistor element 59*a*, a holder 59*b*, ceramic paper 59*c*, and an insulating resin sheet 59*d*. The ceramic paper 59*c* has the function of blocking the thermal conduction between the holder 59*b* and the thermistor element 59*a*. The insulating resin sheet 59*d* has the function of protecting the thermistor element 59*a* physically and electrically. The thermistor element 59*a* changes in output value according to the temperature of the heater 54. The thermistor element 59*a* is connected to the CPU 94 via a Dumet wire (not shown) and a wiring line. The thermistor element 59*a* detects the temperature of the heater 54 and outputs the detection result to the CPU 94.

The thermistor 59 is located, on an opposite surface of the substrate 54*a* from the protective glass layer 54*e*, at the position of the reference line a in the longitudinal direction of the heating element 54*b* (a position corresponding to the longitudinal center) and is in contact with the substrate 54*a*. The thermistors 60 and 61 also have the same cross-sectional configuration.

Thermistor 59 is also referred to as a main thermistor 59. The CPU 94 controls the power to be supplied to the heater 54 based on the detection result of the main thermistor 59. The thermistors 60 and 61 are also referred to as sub-thermistors. Sub-thermistor elements 60*a* and 61*a* are disposed bilaterally symmetrically in the longitudinal direction with respect to the reference line a. The sub-thermistor elements 60*a* and 61*a* are arranged at the positions corresponding to the opposite ends of the heating element 54*b*3. The distance S3 between the sub-thermistor element 60*a* and the sub-thermistor element 61*a* is expressed as S3=142 mm and L3>S3. The sub-thermistors 60 and 61 are arranged at the opposite ends of the shortest heating element 54*b*3 to monitor an increase in the non-sheet passing portion temperature when a sheet narrower than 142 mm (for example, a sheet of A6 size (105 mm in width)) is passed.

All of the main thermistor 59 and the sub-thermistors 60 and 61 are arranged inside the width L3=154 mm of the shortest heating element 54*b*3. This is for the purpose of safely addressing a rare failure. For example, even if one of the thermistors 59, 60, and 61 breaks down and one of the heating elements 54*b*1, 54*b*2, and 54*b*3 receives an excessive voltage, the excessively high temperature can be detected by the other thermistors not broken, and the fixing unit 50 can be safely stopped. For this reason, the three thermistors 59, 60, and 61 are disposed inside in the width of the shortest heating element **54*b*3. In other words, the sub-thermistors 60 and 61 are disposed closer to the longitudinal ends than the main thermistor 59**.

Power Control Unit

FIG. 6 is a schematic diagram of a power control circuit for the fixing-power control unit 97 for the heater 54 of the fixing unit 50. The power control circuit for the fixing unit 50 includes triacs **56*a* and 56*b* that connect or disconnect the power supply path from an alternating-current power source 55 to the heating elements 54*b*1, 54*b*2, and 54*b*3 and an electromagnetic relay 57 that switches the heating element 54*b*1, 54*b*2, and 54*b*3 for supplying power. The triac 56*a* connects (on) or disconnects (off) the power supply path between the alternating-current power source 55 and the contact point 54*d*4 of the heater 54. In contrast, the triac 56*b* connects (on) or disconnects (off) the power supply path between the alternating-current power source 55 and the electromagnetic relay 57 or between the alternating-current power source 55 and the contact point 54*d*1 of the heater 54. The electromagnetic relay 57 is a common contact (C contact) point relay serving as a heating-element control unit that controls power to be supplied to the plurality of heating elements 54*b*1, 54*b*2, and 54*b*3 and switches the contact point 54*d*3 of the heater 54 so as to connect to the triac 56*b* or the alternating-current power source 55. The contact point 54*d*2 of the heater 54 is constantly connected the alternating-current power source 55**.

For example, when power is to be supplied from the alternating-current power source 55 to the heating element **54*b*1, the triac 56*a* is turned on to connect the alternating-current power source 55 and the contact point 54*d*4 of the heater 54, and the triac 56*b* is turned off. Thus, the heating elements 54*b*1 (54*b*1*a* and 54*b*1*b*) are connected to the alternating-current power source 55 via the contact points 54*d*2 and 54*d*4 of the heater 54**.

When power is to be supplied from the alternating-current power source 55 to the heating element **54*b*2, the triac 56*b* is turned on to connect the alternating-current power source 55 and the electromagnetic relay 57 so that the contact point 54*d*3 of the heater 54 is connected to the triac 56*b*, and the triac 56*a* is turned off. Thus, one end of the heating element 54*b*2 is connected to the alternating-current power source 55 via the contact point 54*d*3 of the heater 54, the electromagnetic relay 57, and the triac 56*b*, and the other end of the heating element 54*b*2 is connected to the alternating-current power source 55 via the contact point 54*d*2 of the heater 54**.

When power is to be supplied from the alternating-current power source 55 to the heating element **54*b*3, the triac 56*b* is turned on so that the electromagnetic relay 57 connects the contact point 54*d*3 of the heater 54 to the alternating-current power source 55, and the triac 56*a* is turned off. Thus, one end of the heating element 54*b*3 is connected to the alternating-current power source 55 via the contact point 54*d*3 of the heater 54 and the electromagnetic relay 57, and the other end of the heating element 54*b*3 is connected to the alternating-current power source 55 via the contact point 54*d*1 of the heater 54 and the triac 56*b*. The CPU 94 calculates the amount of power required to make the temperature of the heater 54 reach a target temperature suitable for image formation on the sheet P on the basis of the temperature information on the heater 54 detected by the fixing temperature sensor 59. This embodiment uses proportional-integral (PI) control for controlling the temperature of the heater 54**. However, the method of control is illustrative only.

Power Ratio Control

To supply power at a power ratio for making the temperature of the heater 54 reach a target temperature, the CPU 94 controls the triacs **56*a* and 56*b* and the heating element electromagnetic relay 57 to allocate the time for supplying power to the heating elements 54*b*1, 54*b*2, and 54*b*3. The switching of power supply to the heating elements 54*b*1, 54*b*2, and 54*b*3 is performed every four periods of the frequency of the alternating-current power source 55**.

Assume that one cycle of the power supply time is 10, the time ratio of power supply to the heating elements **54*b*1*a* and 54*b*1*b* (hereinafter also referred to as a power ratio) is 2, and the time ratio of power supply (power ratio) to the heating element 54*b*2 is 8. In this case, the alternating-current power source 55 is connected to the heating element 54*b*1 to supply power for 8 periods (=4×2). Thereafter, heating elements to be supplied with power are switched, and the alternating-current power source 55 is connected to the heating element 54*b*2 to supply power for 32 periods (=4×8). The switching of power supply is repeated. In other words, the power supply path is switched again to the heating element 54*b*1 to supply power to the heating element 54*b*1**. In this embodiment, the power supply time ratio (power ratio) can be switched from 10:0 to 0:10 in increments of 1.

This embodiment achieves the power ratio for making the temperature of the heater 54 reach a target temperature by allocating the time of power supply from the alternating-current power source 55. However, this is illustrative only. The amount of power supplied to the heating elements may be allocated to achieve a target ratio using one or a combination of time, a voltage, and an electric current. For example, a desired power ratio may be achieved by providing each heating element with a triac and switching ON/OFF of each triac using the CPU 94 to control the amount of an electric current to be supplied to each heating element. The resolution of the ratio is not limited to 10, described above, and the ratio may be set to any resolution.

Predicting Temperature of Fixing Unit

Next, a count temperature prediction method for predicting the temperature of the heater 54 of the fixing unit 50 will be described. This embodiment uses a count value to predict the temperatures of the components (for example, the film 51, the pressure roller 53, and the heater holder 52) of the fixing unit 50. The count value is stored in the CPU 94 or the memory 95 and increases by +1 every time one sheet P is subjected to a fixing process. For this reason, the count value increases as the number of sheets P subjected to the fixing process increases.

In a standby state after completion of the fixing process, the components of the fixing unit 50 is naturally cooled to decrease in temperature. The count value is counted down with time. Specifically, the count value is subtracted using an arithmetic expression using the elapsed time as a parameter in accordance with the measured cooling characteristics of each of the components of the fixing unit 50. The method for predicting the temperatures of the components of the fixing unit 50 on the basis of the count value in this way is referred to as a count temperature prediction method.

Power Required for Each Zone

For example, the interval from a count value of 0 to a first target count value is set to zone 1, and the interval from the first target count value to a second target count value is set to zone 2. The interval from the second target count value to a third target count value is set to zone 3, and the interval from the third target count value onward is set to zone 4. In each zone, the timing of switching the power supply to the heating element **54*b*1 is set. Examples of the number of zones set include, but are not limited to, 4**, and any plurality of zones may be set.

In this embodiment, four zones are set in which the first target count value is set to 30, the second target count value is set to 100, and the third target count value is set to 200. For example, assume that printing on the sheets P is started from a cold state of the fixing unit 50 (in which the count is 0). On completion of printing on 30 sheets P, that is, on completion of a fixing process on 30 sheets P, the count value reaches the first target count value 30. For this reason, on completion of printing on 30 sheets P, zone 1 ends and shifts to zone 2 from printing on the 31th sheet P.

The amount of heat generation required for the heating elements **54*b*1, 54*b*2, and 54*b*3 to fix an unfixed toner image formed on the sheet P changes according to the amount of heat stored in the heater 54 of the fixing unit 50. If the heater 54 of the fixing unit 50 is cold, a large amount of heat is required correspondingly, but if the heater 54 of the fixing unit 50** is warmed such as after continuous printing, the amount of heat required is small correspondingly.

Table 1 shows power required for each zone, described above, per unit length of the heater 54. The left column in Table 1 shows zones (1 to 4), and the right column shows power required for each zone per unit length of the heater 54 (in W/m (meter)).

The required power shown in Table 1 was determined by evaluating the toner fixing performance on the sheet P while experimentally changing the power for each zone. The values of the required power shown in Table 1 are rounded off to the first place.

TABLE 1

| Zone | Required Power (W/m) |
|---|---|
| 1 | 4,440 |
| 2 | 3,920 |
| 3 | 3,420 |
| 4 | 3,020 |

Relationship between Input Voltage of Alternating-Current Power Source and Power Ratio of Heating Elements In this embodiment, the maximum heat generation amount of the heating element **54*b*1, which is longest in the longitudinal direction, is the largest, as described above. This allows, when the heater 54 of the fixing unit 50 is cold, the waiting time until the heater 54 reaches the target temperature to be shortest by supplying maximum power to the heating element 54*b*1**.

With the heater 54 of the fixing unit 50 warmed, the phenomenon of an increase in the temperature or the non-sheet passing portion occurs in which the temperature of the heater 54 of the fixing unit 50 increases gradually at the longitudinal ends of the heating element **54*b*1 through which the sheets P do not pass (non-sheet passing region). For this reason, an increase in the temperature of the non-sheet passing portion is reduced by switching to the heating element 54*b*2 or the heating element 54*b*3** in accordance with the size of the sheets P used.

However, since the maximum power for the heating elements **54*b*2 and 54*b*3 is set small, as described above, the required power for each zone cannot be achieved with a single element. For this reason, this embodiment uses the heating element 54*b*1 supplementally to compensate for the shortage of the required power. The required power decreases as the heater 54 of the fixing unit 50 becomes warm. This allows the ratio of power supplied to the heating element 54*b*1 to be decreased. If the increase in the temperature of the non-sheet passing portion is large, the power ratio of the heating element 54*b*1 is decreased to reduce the increase in temperature. Since the power ratio of the heating element 54*b*2 or 54*b*3 that require lower power increases relatively, the heat generation amount of the heater 54** decreases, providing the advantageous effect of reducing an increase in the temperature of the non-sheet passing portion.

Power Ratio at Input Voltage of 110 V

A specific example of power supply control for continuous printing on A5-size sheets P at an input voltage of 110 V will be described. The image forming apparatus of this embodiment is capable of printing on A5-size sheets P at a productivity of 30 sheets per minute. In printing on A5-size sheets P, the fixing unit 50 performs a fixing operation while exclusively switching between the heating elements **54*b*1 and 54*b*3. When the input voltage is 110 V, the maximum power for the heating element 54*b*1 is 5,450 W/m, and the maximum power for the heating element 54*b*3** is 2,619 W/m.

Table 2 below shows the required power (in W/m), the power ratio when one cycle of the power supply period is 10, and the maximum power of the sheet-passing region (in W/m) of each zone. The sheet-passing region maximum power for each zone can be obtained from Eq. (2).

$$\text{sheet-passing region maximum power}=(\text{maximum power for heating element }54b1)\times(\text{power ratio of heating element }54b1)+(\text{maximum power for heating element }54b3)\times(\text{power ratio of heating element }54b3) \quad (2)$$

Table 2 shows that the power ratio of the heating elements **54*b*1 and 54*b*3** in zone 1 is 7:3. Therefore, the sheet-passing region maximum power=(5,450 W/m)×(7/10)+(2,619 W/m)×(3/10)=3,815+785.7=4,600.7≈4,600 (W/m) (the first place is rounded) can be obtained from Eq. (2).

Table 2 shows that the power ratio of the heating elements **54*b*1 and 54*b*3** in zone 2 is 5:5. Therefore, sheet-passing region maximum power=(5,450 W/m)×(5/10)+(2,619 W/m)×(5/10)=2,725+1,309.5=4,034.5≈4,030 (W/m) (the first is rounded) can be obtained from Eq. (2).

Table 2 shows that the power ratio of the heating elements **54*b*1 and 54*b*3** in zone 3 is 3:7. Therefore, the sheet-passing region maximum power=(5,450 W/m)×(3/10)+(2,619 W/m)×(7/10)=1,635+1,833.3=3,468.3≈3,470 (W/m) (the first place is rounded) can be obtained from Eq. (2).

Table 2 shows that the power ratio of the heating elements **54*b*1 and 54*b*3 in zone 4** is 2:8. Therefore, the sheet-passing region maximum power=(5,450 W/m)×(2/10)+(2,619 W/m)×(8/10)=1,090+2,095.2=3,185.2≈3,190 (W/m) (the first place is rounded) can be obtained from Eq. (2).

Table 2 shows the required power, the power ratio, and the maximum power of the sheet-passing region of each zone. In any of the zones, the relationship of required power<sheet-passing region maximum power holds.

TABLE 2

| Zone | Required Power (W/m) | Power Ratio: Heating Element 54b1 | Power Ratio: Heating Element 54b3 | Maximum Power of Sheet-Passing Region (W/m) |
|---|---|---|---|---|
| 1 | 4,440 | 7 | 3 | 4,600 |
| 2 | 3,920 | 5 | 5 | 4,030 |
| 3 | 3,420 | 3 | 7 | 3,470 |
| 4 | 3,020 | 2 | 8 | 3,190 |

Sub-Thermistor and Throughput Reduction

Next, throughput reduction control according to the results of the sub-thermistors 60 and 61 will be described. The throughput reduction refers to decreasing production efficiency, or the number of sheets printed per unit time, by increasing the conveyance interval between the sheets P. In other words, the conveyance interval is the interval between the preceding sheet P and the following sheet P.

The distance S3 shown in FIG. 4 is the interval between the sub-thermistors 60 and 61. The distance S3 is 142 mm. The heating elements 54*b*1, 54*b*2, and 54*b*3 are 222 mm, 188 mm, and 154 mm in length, respectively, in order from the longest. For example, in forming an image on A6-size sheets P with a width of 105 mm, fixing is performed while switching from the heating element 54*b*1 (222 mm in width) to the heating element 54*b*3 (154 mm in width). However, since the A6-size sheets P are narrower, forming images continuously on the sheets P can increase the temperature of the non-sheet passing portion.

For this reason, the conveyance interval between the sheets P is increased to prevent the increase in the temperature of the non-sheet passing portion in accordance with the detection results of the sub-thermistors 60 and 61. During the fixing on the sheets P with the fixing unit 50, the conveyance interval is adjusted in accordance with the highest temperature detected by the sub-thermistors 60 and 61. The highest temperature detected by the sub-thermistors 60 and 61 is updated every time printing is performed on the sheets P. Table 3 shows the relationship between the highest temperature detected by the sub-thermistors 60 and 61 and the conveyance interval between the sheets P. For example, if the detection result of the sub-thermistor is 243° C., the temperature corresponds to Lv3, and the conveyance interval between the sheets P is set to 400 mm. The conveyance interval between the sheets P is set in accordance with the timing for feeding the next sheet P.

TABLE 3

| Lv | Maximum Temperature (° C.) | Conveyance Interval between Sheets P |
|---|---|---|
| 1 | - 230 | 50 mm |
| 2 | 230-240 | 200 mm |
| 3 | 240-250 | 400 mm |
| 4 | 250 - | 600 mm |

To illustrate the challenges in this embodiment, printing is performed under the conditions shown in Table 4. Table 4 shows conditions in printing three types of sheets P with different widths. Challenges when image formation is performed under these conditions will be described.

TABLE 4

| Condition | Sheet Width W | Sheet Length L | Zone | Number of Sheets | Power Ratio |
|---|---|---|---|---|---|
| A | 120 | 148 | 1 | 30 | 7:3 |
| B | 105 | 148 | 1 | 30 | 7:3 |
| C | 90 | 148 | 1 | 30 | 7:3 |

The zone in Table 4 indicates the degree of warming of the fixing unit 50 before printing. Zone 1 indicates that the fixing unit 50 is sufficiently cooled. In this state, continuous printing on 30 sheets P is performed. Table 2 shows that the power ratio is 7:3 under any conditions. The power supply is controlled so that the main thermistor 59 reads 210° C. Printing is started at an initial conveyance interval between the sheets P of 50 mm.

Figure 7:
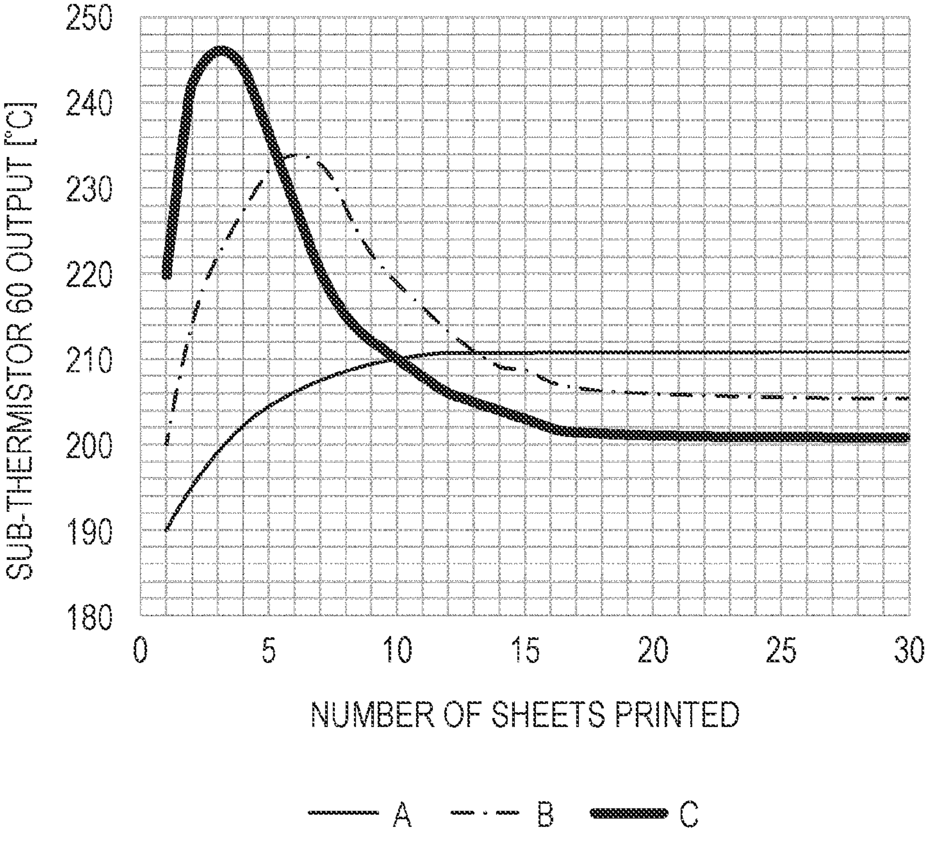
FIG. 7 is a graph showing the output of a sub-thermistor.

FIG. 7 shows the output of the sub-thermistor when image formation is performed under the three conditions.

The thin solid line indicates condition A, the dashed-dotted line indicates condition B, and the thick solid line indicates condition C. Since the outputs of the sub-thermistors 60 and 61 were substantially the same, FIG. 7 shows the output of the sub-thermistor 60.

Under condition A, the detection result of the sub-thermistor 60 fell below 230° C. even when image formation was performed on 30 sheets P, and the conveyance interval between the sheets P was not changed from 50 mm.

Under condition B, when image formation was performed on the fifth sheet P, the detection result of the sub-thermistor 60 exceeded 230° C. Table 3 shows that this is in the state of Lv2, in which the conveyance interval from the sixth sheet P increased from 50 mm to 200 mm. Thus, an increase in the conveyance interval suppressed an increase in the temperature of the non-sheet passing portion, resulting in a decrease in the temperature detected by the sub-thermistor 60.

Under condition C, when image formation was performed on the second sheet P, the detection result of the sub-thermistor 60 exceeded 240° C. Table 3 shows that this is in the state of Lv3, in which the conveyance interval from the third sheet P increased from 50 mm to 400 mm. Thus, like condition B, an increase in the conveyance interval suppressed an increase in the temperature of the non-sheet passing portion, resulting in a decrease in the temperature detected by the sub-thermistor 60.

Figure 8:
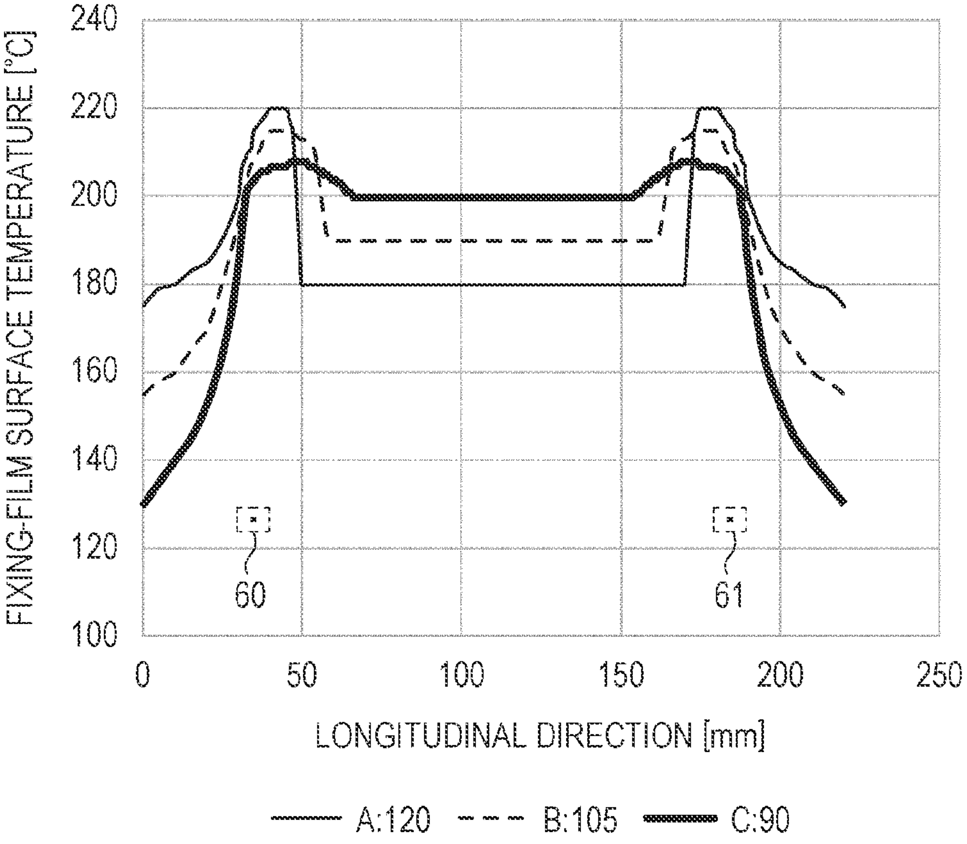
FIG. 8 is a graph showing the temperature profiles of the fixing film in the longitudinal direction.

FIG. 8 shows the temperature profiles of the fixing film in the longitudinal direction under conditions A, B, and C. These are the temperature profiles of the fixing film in the longitudinal direction immediately before the 30th sheet P enters the fixing nip portion under the individual conditions A, B, and C. This temperature profiles are of the surface of the fixing film from the left in the cross-sectional view of the fixing unit in FIG. 3 in the longitudinal direction.

The thin solid line corresponds to condition A, the dashed line corresponds to condition B, and the thick solid line corresponds to condition C.

This shows that the temperature in the longitudinal center was higher in order of conditions C, B, and A. This is because the increase in the conveyance interval between the sheets P decreased the frequency of the passage of the sheet P through the fixing unit, thereby reducing the amount of heat removed from the fixing unit 50. The fixing film can accumulate energy (heat) in the interval in which the sheets P are not passing through the fixing unit. In other words, an increase in the conveyance interval increases the temperature of the fixing film in the sheet passing region (longitudinal center).

The graph shows that the temperatures at the longitudinal ends are lower in order of condition C, B, and A. While the sheets P are passing through the fixing unit, the heat is removed by the sheets P, which makes the amount of energy (power) used per unit time larger than that in the interval through which the sheets P are not passing. An increase in the conveyance interval increases a period during which the sheets P are not passing through the fixing unit, which decreases the amount of energy used per unit time. This decreases the amount of energy supplied to the non-sheet passing region per unit time, which decreases the temperature relative to the other region.

Among the three conditions, the temperature difference between the center and the ends in the longitudinal direction is largest under condition C. The large temperature difference between the center and the ends in the longitudinal direction can cause the fixing film to be crinkled. Thus, the increased conveyance interval may disadvantageously cause a large temperature difference between the center and the ends in the longitudinal direction. In this embodiment, the ratio of power provided to the heating elements is controlled so that the temperature difference is prevented or minimized.

Control of Power Ratio

In this embodiment, the ratio of power to be supplied to the heating elements is changed based on the conveyance interval. Table 5 shows the conveyance interval and the power ratio in zone 1.

TABLE 5

| Zone 1 | Power Ratio | |
|---|---|---|
| Conveyance Interval | Heating Element 54b1 | Heating Element 54b3 |
| - 50 mm | 7 | 3 |
| 50 mm-200 mm | 8 | 2 |
| 200 mm-400 mm | 9 | 1 |
| 400 mm - | 10 | 0 |

In this embodiment, the power ratio for the heating element **54*b*1** is increased when the conveyance interval between the sheets P increases.

Figure 9:
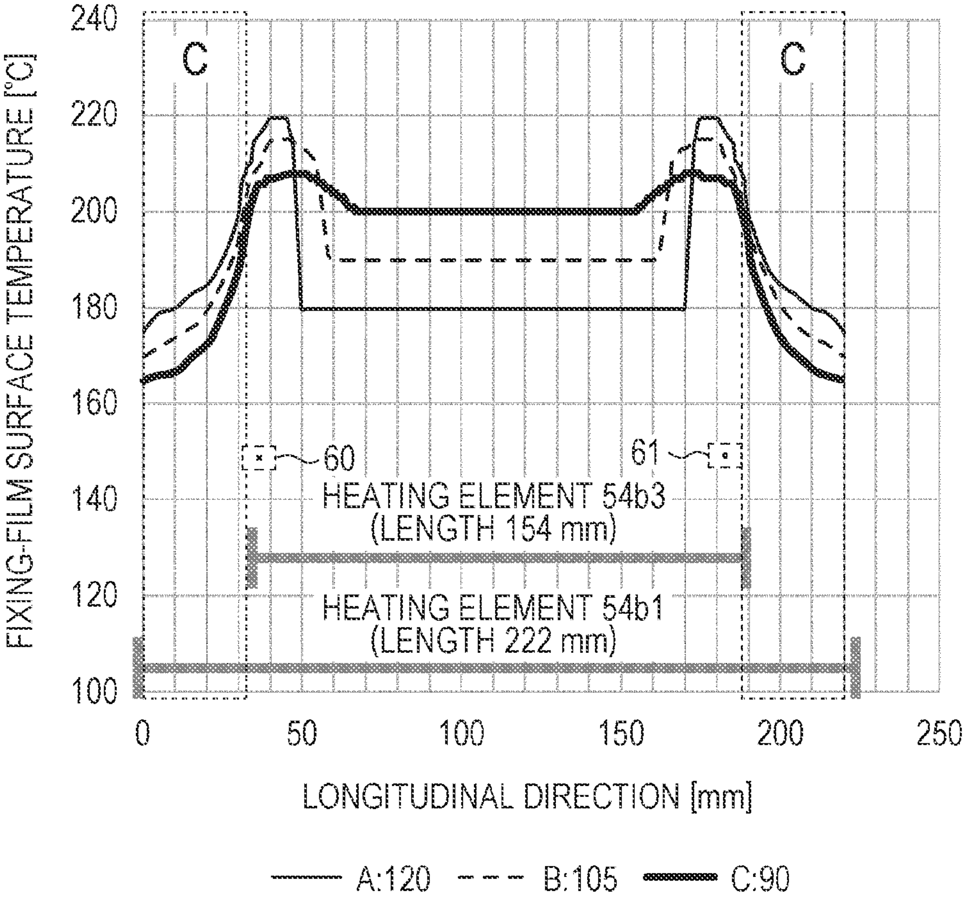
FIG. 9 is a graph showing the temperature profiles of the fixing film in the longitudinal direction.

To ascertain the beneficial effects of this embodiment, printing was executed under the conditions shown in Table 4 and Table 5. FIG. 9 shows the temperature profiles of the fixing film in the longitudinal direction under conditions A, B, and C. These are the temperature profiles of the fixing film in the longitudinal direction immediately before the 30th sheet P enters the fixing nip portion under the individual conditions A, B, and C. This shows that the temperatures at the longitudinal ends under conditions B and C are higher than those of the temperature profiles in FIG. 8. This shows that the temperature difference between the center and the ends in the longitudinal direction can be decreased, providing the beneficial effect of suppressing a decrease in the temperature at the ends in this embodiment. For condition A, the conveyance interval was not changed. For this reason, the temperature profile of the fixing film in the longitudinal direction was not changed.

For condition A, since the conveyance interval was kept at 50 mm, the power ratio was also not changed. For condition B, since the conveyance interval was changed from 50 mm to 200 mm, the power ratio was changed from 7:3 to 8:2. For condition C, since the conveyance interval was changed from 50 mm to 400 mm, the power ratio was changed from 7:3 to 9:1. Changing the power ratio to increase the power ratio of the heating element **54*b*1 means that the amount of energy per unit time for the regions C in FIG. 9. Thus, a decrease in the temperature of the fixing film in the regions C could be reduced. The regions C are within the region of the heating element 54*b*1 and outside the region of the heating element 54*b*3**.

Thus, changing the power ratio of the heating element **54*b*1 based on the conveyance interval can prevent or minimize an increase in the temperature difference between the center and the ends in the longitudinal direction of the fixing film even when throughput reduction in response to the detection results of the sub-thermistors 60 and 61** is performed.

Flowchart

Figure 10:
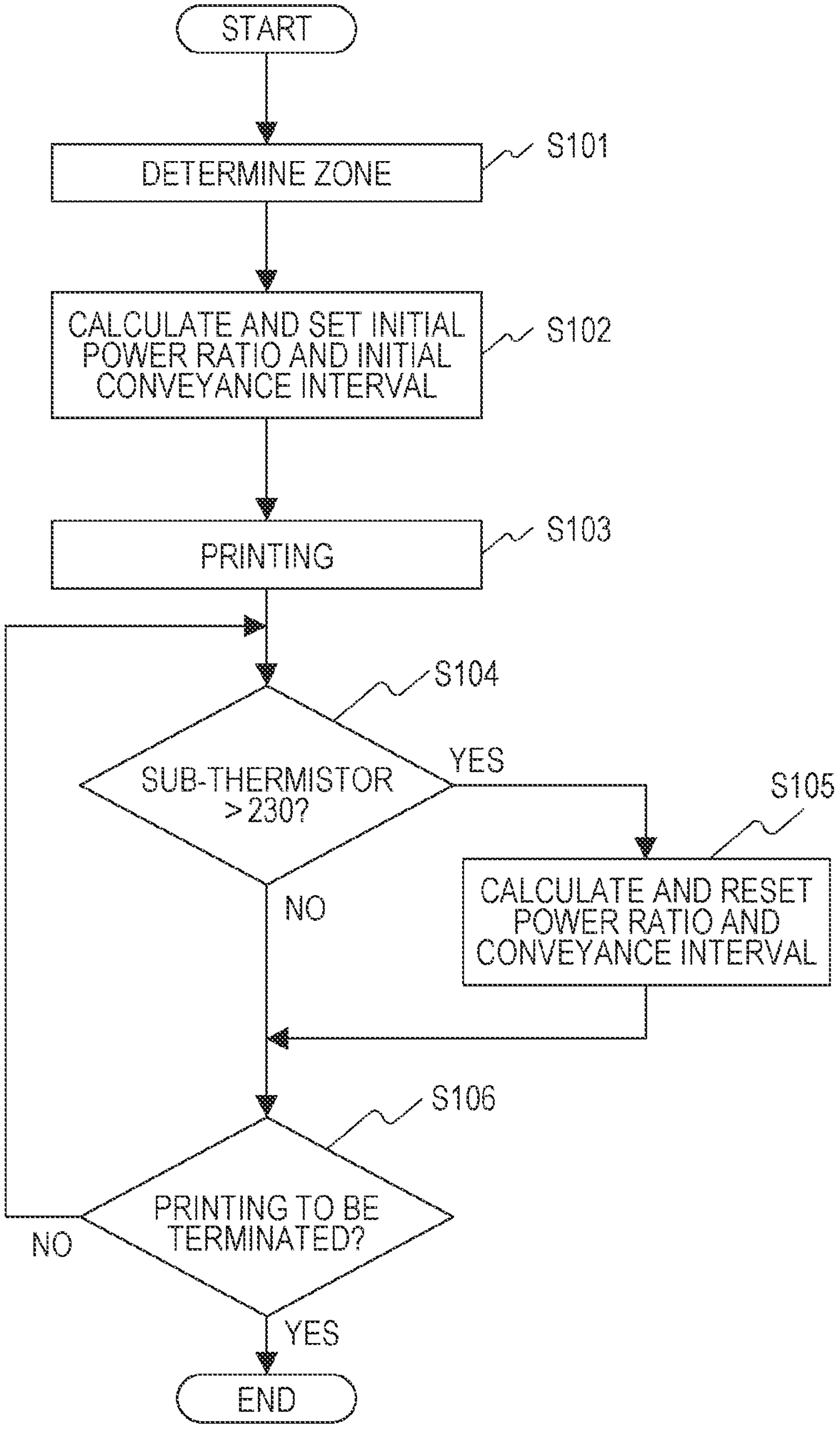
FIG. 10 is a flowchart for controlling the power ratio.

FIG. 10 shows a flowchart of this embodiment. In S101, the CPU 94 determines a zone based on the degree of warming of the fixing unit. In S102, the CPU 94 sets the power ratio and the conveyance interval between the sheets P at the initial stage based on the determined zone. In S103, the CPU 94 starts printing.

In S104, the CPU 94 obtains the highest temperature from the detection results of the sub-thermistors 60 and 61. If the highest temperature is higher than 230° C., the process goes to S105, and if the highest temperature is less than 230° C., the process goes to S106. In S105, the CPU 94 sets the conveyance interval between the sheets P based on the highest temperature. The CPU 94 also sets the power ratio of the heating element **54*b*1** based on the highest temperature.

In S106, the CPU 94 determines whether to continue the printing. If the printing is to be continued, the process returns to S104, and if not, the process is terminated.

Thus, this embodiment changes the power ratio of the heating element **54*b*1** based on the conveyance interval between the sheets P. This allows preventing or minimizing an increase in the temperature difference between the center and the ends in the longitudinal direction of the fixing film.

Second Embodiment

The first embodiment describes control for increasing the conveyance interval between the sheets P in response to the detection results of the sub-thermistors 60 and 61 and increasing the power ratio of the heating element **54*b*1** based on the conveyance interval.

This embodiment describes control for decreasing the conveyance interval in response to the detection results of the sub-thermistors 60 and 61 and decreasing the power ratio of the heating element **54*b*1** based on the conveyance interval. The same reference signs are used for the components and configurations identical to those of the first embodiment, such as the image forming apparatus, the block diagram, the fixing unit, the heater, the fixing temperature sensor, the power control unit, power ratio control, prediction of the temperature of the fixing unit, and required power for each zone, and detailed descriptions here are omitted.

Initial Conveyance Interval

The first embodiment describes control for setting the initial conveyance interval as small as possible and increasing the conveyance interval in response to the detection results of the sub-thermistors. The second embodiment describes control for setting the initial conveyance interval as large as possible and decreasing the conveyance interval in response to the detection results of the sub-thermistors. The initial conveyance interval is set as large as possible on condition that the width of the sheets P specified by the user can be determined before the CPU 94 starts a printing operation. For example, if the sheets P are found to be narrow, increasing the initial conveyance interval can prevent or minimize an increase in the temperature at the ends. In other words, the possibility that relatively high temperatures are detected by the sub-thermistors 60 and 61 can be prevented or minimized. Setting the initial conveyance interval as large as possible is effective, for example, in preventing the fixing film or the pressure roller from becoming hot as much as possible.

However, setting the initial conveyance interval large causes throughput reduction, resulting in low production efficiency. For this reason, throughput increase control for decreasing the conveyance interval in response to the detection results of the sub-thermistors 60 and 61 is performed. This allows balancing temperature control and production efficiency.

Sub-Thermistor and Throughput Increase

Next, throughput increase control in response to the detection results of the sub-thermistors 60 and 61 will be described. The throughput increase refers to control for increasing the production efficiency, which is the number of sheets printed per unit time, by decreasing the conveyance interval between the sheets P.

The distance S3 shown in FIG. 4 is the interval between the sub-thermistors 60 and 61. The distance S3 is 142 mm. The heating elements **54*b*1, 54*b*2, and 54*b*3 are 222 mm, 188 mm, and 154 mm in length, respectively, in order from the longest. For example, in forming an image on A6-size sheets P with a width of 105 mm, fixing is performed while switching from the heating element 54*b*1 (222 mm in width) to the heating element 54*b*3** (154 mm in width). However, since the A6-size sheets P are narrower, forming images continuously on the sheets P can increase the temperature of the non-sheet passing portion.

For this reason, the initial conveyance interval is set large in advance based on the width of the sheets P. For example, for image formation on A6-size sheets P (105 mm in width), the initial conveyance interval is set to 600 mm. The conveyance interval is adjusted based on the highest temperatures of the sub-thermistors 60 and 61.

Table 6 shows the relationship between the highest temperatures detected by the sub-thermistors 60 and 61 and the conveyance interval between the sheets P. For example, if the highest temperature of the sub-thermistor is 235° C., it corresponds to Lv2, and the conveyance interval is decreased from 600 mm to 200 mm.

TABLE 6

| Lv | Maximum Temperature (° C.) | Conveyance Interval |
|---|---|---|
| 1 | 240 - | 400 mm |
| 2 | 230-240 | 200 mm |
| 3 | - 220 | 50 mm |

To illustrate the challenges in this embodiment, printing is performed under the condition shown in Table 7.

TABLE 7

| Condition | Sheet Width W | Sheet Length L | Zone | Number of Sheets | Power Ratio |
|---|---|---|---|---|---|
| D | 105 | 148 | 1 | 30 | 10:0 |

The zone in Table 7 indicates the degree of warming of the fixing unit 50 before printing. Zone 1 indicates that the fixing unit 50 is sufficiently cooled. In this state, continuous printing on 30 sheets P is performed. The power ratio was set to 10:0 in view of the balance of a decrease in the temperature of the longitudinal ends and an increase in the temperature of the non-sheet passing portion with reference to Table 5 in the first embodiment. The power supply is controlled so that the main thermistor 59 reads 210° C. Printing is started at an initial conveyance interval between the sheets P of 600 mm.

Figure 11:
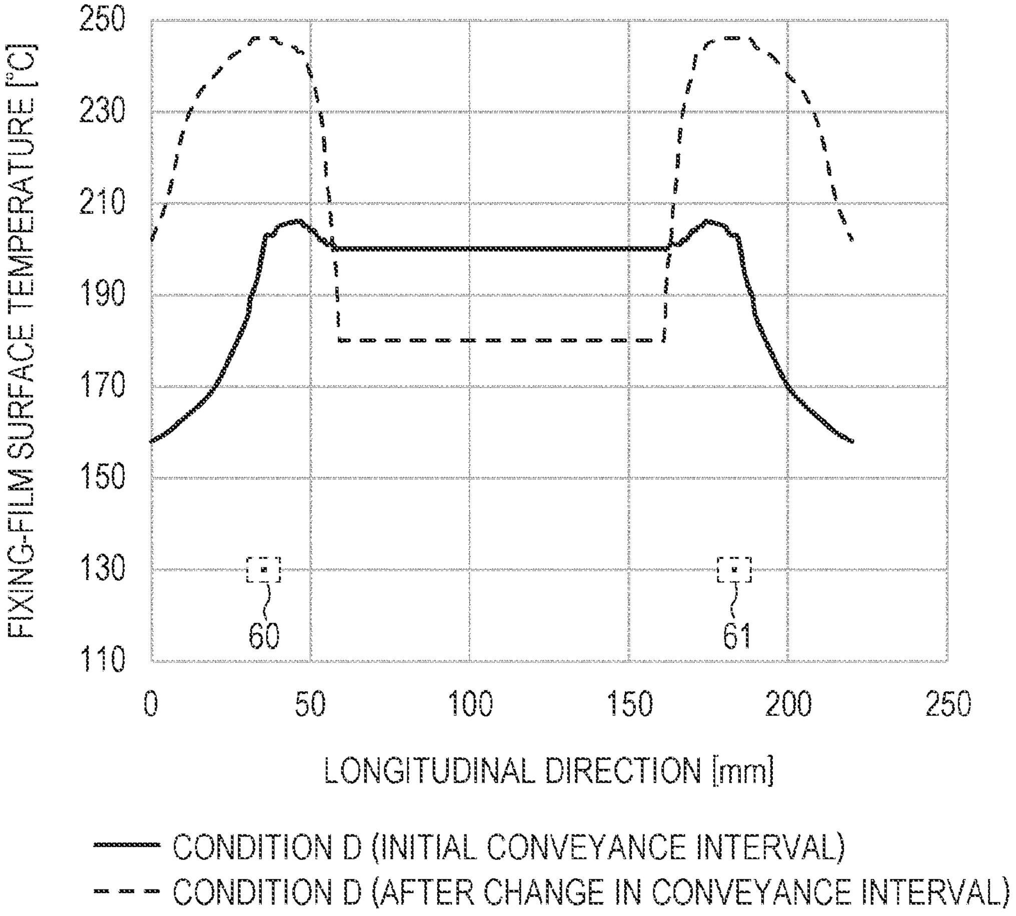
FIG. 11 is a graph showing the temperature profiles of the fixing film in the longitudinal direction.

FIG. 11 shows a temperature profile of the fixing film in the longitudinal direction immediately before the fifth sheet P enters the fixing nip portion. The thick solid line in FIG. 11 indicates the temperature profile of a conveyance interval of 600 mm. The dashed line indicates the temperature profile of the fixing film in the longitudinal direction immediately before the 30th sheet P enters the fixing nip portion after the conveyance interval is changed. FIG. 11 also shows the sub-thermistors 60 and 61 so that the positional relationship between the temperature profiles of the fixing film in the longitudinal direction and the sub-thermistors 60 and 61 can be seen.

Since the initial conveyance interval is 600 mm, there is no increase in the temperature of the non-sheet passing portion of the fixing film.

In the first to fourth sheets P, the highest temperatures of the sub-thermistors 60 and 61 did not reach 220° C. Thus, the highest temperature corresponds to Lv3 with reference to Table 6, the conveyance interval was changed from 600 mm to 50 mm.

The change in the conveyance interval to 50 mm, as indicated by the dashed line in FIG. 11, has caused an increase in the temperature of the non-sheet passing portion. This shows that the temperature of the non-sheet passing portion of the fixing film has exceeded 240° C. Thus, the decrease in conveyance interval disadvantageously causes an increase in the temperature of the non-sheet passing portion (an increase in the temperature difference between the center and the ends in the longitudinal direction). This embodiment controls the ratio of power to be supplied to the heating elements so as to prevent or minimize the increase in the temperature of the non-sheet passing portions. This also prevents or minimizes the deterioration of the rubber layer of the fixing film.

Control of Power Ratio

In this embodiment, the ratio of power to be supplied to the heating elements is also changed based on the conveyance interval. Table 8 shows the conveyance interval and the power ratio in zone 1.

TABLE 8

| Zone 1 | Power Ratio | |
|---|---|---|
| Conveyance Interval | Heating Element 54b1 | Heating Element 54b3 |
| 400 mm | 10 | 0 |
| 200 mm-400 mm | 9 | 1 |
| 50 mm-200 mm | 8 | 2 |
| - 50 mm | 7 | 3 |

In this embodiment, the power ratio of the heating element **54*b*1** is controlled so that it is decreased when the conveyance interval between the sheets P decreases.

Figure 12:
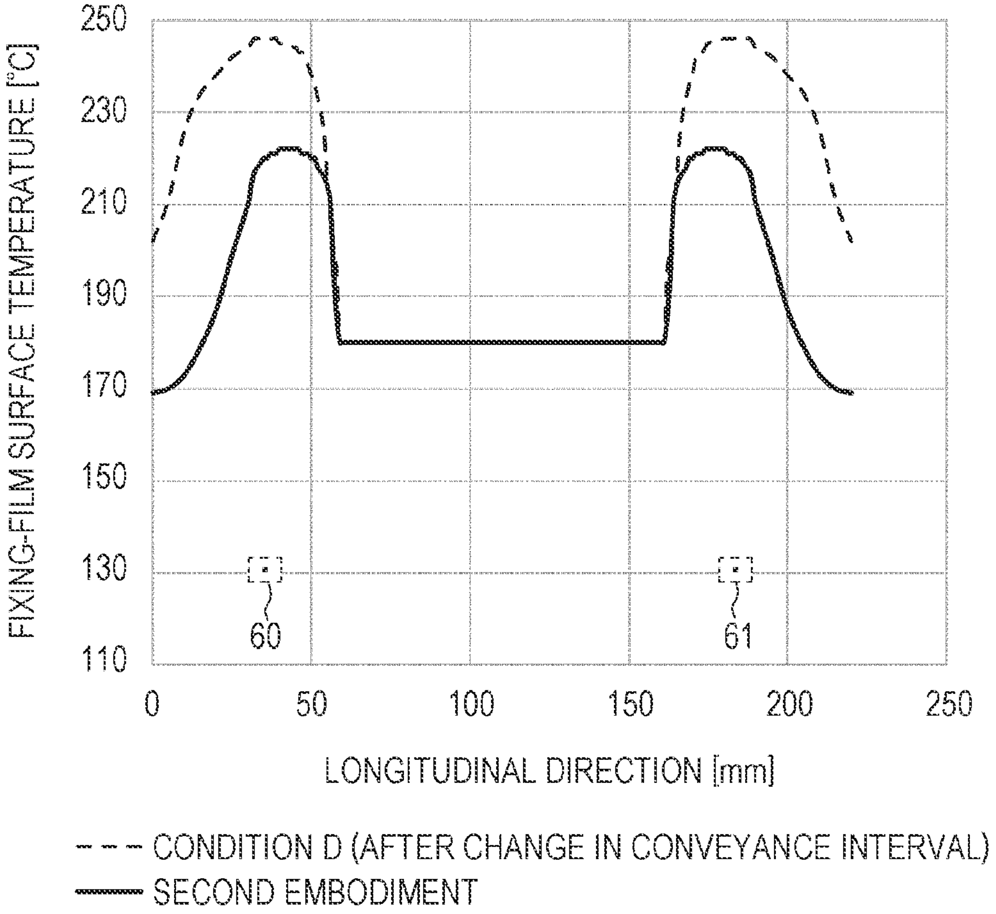
FIG. 12 is a graph showing the temperature profiles of the fixing film in the longitudinal direction.

To ascertain the beneficial effects of this embodiment, printing was executed under condition D shown in Table 7 in control for changing the power ratio based on the conveyance interval in accordance with Table 8. FIG. 12 shows the temperature profiles of the fixing film in the longitudinal direction immediately before the 30th sheet P enters the fixing nip portion. The solid line indicates the temperature profile of this embodiment, and the dashed line indicates the temperature profile of a comparative example.

A comparison between the thin solid line and the dashed line in FIG. 12 shows that the temperature indicated by the dashed line at the non-sheet passing portions rises to nearly 250° C., whereas the temperature indicated by the solid line is suppressed at about 220° C. at the non-sheet passing portions.

Since the control in this embodiment decreases the power ratio of the heating element **54*b*1** when the conveyance interval decreases, an increase in the temperature of the non-sheet passing portions can be prevented or minimized even when the conveyance interval decreases.

Thus, changing the power ratio of the heating element **54*b*1** based on the conveyance interval allows preventing or minimizing an increase in the temperature difference between the center and the ends of the fixing film in the longitudinal direction even if throughput is increased. The change also allows for preventing or minimizing an increase in the temperature of the non-sheet passing portions of the fixing film.

Other Configurations

In the first and second embodiments, the conveyance interval is changed in response to the detection results of the sub-thermistors 60 and 61.

However, for example, even for a configuration of a fixing unit without the sub-thermistors, the conveyance interval can be changed based on the information on the difference between the longitudinal length of each heating element and the width of the sheet P and the count value indicating the number of sheets P passed. For example, when a certain number of sheets P narrower in width than the longitudinal length of the heating elements are passed, a prediction that the temperature of the non-sheet passing portions may exceed a predetermined temperature is made, and the conveyance interval is increased.

Even with such a fixing unit, when the conveyance interval is changed, the temperature profile in the longitudinal direction of the fixing film may change as in the first and second embodiments. For this reason, the power ratio of the heating element **54*b*1** is changed in response to a change in the conveyance interval, as in the first and second embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-181542, filed Nov. 14, 2022, which is hereby incorporated by reference herein in its entirety.

What is claimed is:

1. A heating apparatus comprising:

a first rotatable member;

a heater in an inner space of the first rotatable member, wherein the heater includes an elongated substrate, a first heating element, and a second heating element, the first and second heating elements being disposed on the substrate;

first and second temperature detection units configured to detect a temperature of the heater; and a control unit configured to control power to be supplied to the heater, wherein, a direction of a long side of a surface of the substrate on which the heating element is disposed is a longitudinal direction, a direction perpendicular the longitudinal direction of the surface is a crosswise direction, and a direction perpendicular to the longitudinal direction and the crosswise direction is a thickness direction, wherein a length of the first heating element in the longitudinal direction is longer than a length of the second heating element in the longitudinal direction, and wherein the second temperature detection unit is disposed closer to an end of the heater in the longitudinal direction than the first temperature detection unit, and wherein, (a) in response to the second temperature detection unit detecting a first temperature, the control unit sets a conveyance interval between a first sheet and a second sheet conveyed subsequently to a first interval and the control unit sets a power ratio of the first heating element to the second heating element to a first value, and (b) in response to the second temperature detection unit detecting a second temperature higher than the first temperature, the control unit sets the conveyance interval to a second interval longer than the first interval and the control unit sets the power ratio to a second value greater than the first value.

2. The heating apparatus according to claim 1, wherein the control unit controls a target temperature of the heater in response to a detection result detected by the first temperature detection unit.

3. The heating apparatus according to claim 1, wherein the heater includes a third heating element, and wherein a length of the third heating element in the longitudinal direction is shorter than the length of the first heating element in the longitudinal direction and longer than the length of the second heating element in the longitudinal direction.

4. The heating apparatus according to claim 3, wherein the heater includes a fourth heating element, wherein a length of the fourth heating element in the longitudinal direction is the same as the length of the first heating element in the longitudinal direction, and wherein the first heating element, the third heating element, the second heating element, and the fourth heating element are disposed on the substrate in order of the first heating element, the third heating element, the second heating element, and the fourth heating element in the crosswise direction.

5. The heating apparatus according to claim 1, further comprising:
a second rotatable member that forms a nip portion with the first rotatable member,
wherein the first rotatable member comprises a tubular film,
wherein the second rotatable member comprises a pressure roller, and
wherein the nip portion is formed by the heater and the pressure roller with the film disposed therebetween.

6. An image forming apparatus comprising:
an image forming unit configured to form an unfixed toner image on a sheet; and
the heating apparatus according to claim 1.

7. A heating apparatus comprising:
a first rotatable member;
a heater in an inner space of the first rotatable member,
wherein the heater includes a long narrow substrate, a first heating element, and a second heating element, the first and second heating elements being disposed on the substrate;
first and second temperature sensing units configured to detect a temperature of the heater; and
a control unit configured to control power to be supplied to the heater,
wherein, a direction of a long side of a surface of the substrate on which the heating element is disposed is a longitudinal direction, a direction perpendicular to the longitudinal direction of the surface is a crosswise direction, and a direction perpendicular to the longitudinal direction and the crosswise direction is a thickness direction,
wherein a length of the first heating element in the longitudinal direction is longer than a length of the second heating element in the longitudinal direction,
wherein, in response to the second temperature sensing unit detecting a first temperature, the control unit sets a power ratio of the first heating element to the second heating element to a first value, and in response to the second temperature sensing unit detecting a second temperature higher than the first temperature, the control unit sets the power ratio to a second value greater than the first value, and
wherein, in response to image formation on a first number of sheets, the control unit sets the power ratio of the first heating element to the second heating element to the first value, and in response to image formation on a second number of sheets larger than the first number, the control unit set the power ratio to a second value greater than the first value.

8. The heating apparatus according to claim 7,
wherein, in response to the image formation on the first number of sheets, the control unit sets a conveyance interval between a first sheet conveyed first and a second sheet conveyed subsequently to a first interval, and in response to image formation on the second number of sheets, the control unit sets the conveyance interval to a second interval longer than the first interval.

9. The heating apparatus according to claim 7,
wherein the heater includes a third heating element, and
wherein a length of the third heating element in the longitudinal direction is shorter than the length of the first heating element in the longitudinal direction and longer than the length of the second heating element in the longitudinal direction.

10. The heating apparatus according to claim 9,
wherein the heater includes a fourth heating element,
wherein a length of the fourth heating element in the longitudinal direction is the same as the length of the first heating element in the longitudinal direction, and
wherein the first heating element, the third heating element, the second heating element, and the fourth heating element are disposed on the substrate in order of the first heating element, the third heating element, the second heating element, and the fourth heating element in the crosswise direction.

11. The heating apparatus according to claim 7, further comprising:
a second rotatable member that forms a nip portion with the first rotatable member,
wherein the first rotatable member comprises a tubular film,
wherein the second rotatable member comprises a pressure roller, and
wherein the nip portion is formed by the heater and the pressure roller with the film disposed therebetween.

12. An image forming apparatus comprising:
an image forming unit configured to form an unfixed toner image on a sheet; and
the heating apparatus according to claim 7.

* * * * *